United States Patent
Takimoto

(10) Patent No.: US 7,025,164 B2
(45) Date of Patent: Apr. 11, 2006

(54) PROTECTIVE BAG DEVICE FOR PEDESTRIAN AND THE LIKE

(75) Inventor: Takayuki Takimoto, Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/395,840

(22) Filed: Mar. 24, 2003

(65) Prior Publication Data

US 2004/0011581 A1 Jan. 22, 2004

(30) Foreign Application Priority Data

Mar. 26, 2002 (JP) .............................. 2002-085831

(51) Int. Cl.
*B60R 21/34* (2006.01)
(52) U.S. Cl. ................... 180/274; 180/271; 280/730.1
(58) Field of Classification Search ................ 180/271, 180/274; 280/730.1; B60R 21/34
See application file for complete search history.

(56) References Cited

U.S. PATENT DOCUMENTS

| | | | | |
|---|---|---|---|---|
| 5,845,935 | A * | 12/1998 | Enders et al. ............ | 280/730.1 |
| 6,022,046 | A * | 2/2000 | Isomura et al. ............. | 280/731 |
| 6,073,961 | A | 6/2000 | Bailey et al. | |
| 6,089,599 | A * | 7/2000 | Schimmoller et al. ... | 280/743.1 |
| 6,182,782 | B1 * | 2/2001 | Matsuura et al. ........... | 180/274 |
| 6,270,113 | B1 * | 8/2001 | Wipasuramonton et al. ....................... | 280/730.1 |
| 6,302,433 | B1 * | 10/2001 | Ellerbrok et al. ........ | 280/743.2 |
| 6,371,518 | B1 * | 4/2002 | Kalandek et al. ........ | 280/730.1 |
| 6,497,302 | B1 * | 12/2002 | Ryan .......................... | 180/274 |

FOREIGN PATENT DOCUMENTS

| | | |
|---|---|---|
| DE | 201 05 734 U | 8/2001 |
| JP | 11-91503 | 6/1999 |
| JP | 2000118337 | 4/2000 |
| JP | 2003072494 | 3/2003 |
| WO | WO 00/32447 | 6/2000 |
| WO | WO 00/32447 A1 | 9/2002 |

* cited by examiner

*Primary Examiner*—Paul N. Dickson
*Assistant Examiner*—Joselynn Y. Sliteris
(74) *Attorney, Agent, or Firm*—Fitch, Even, Tabin & Flannery

(57) ABSTRACT

To inflate an airbag of a protective bag device for a pedestrian and the like as uniformly as possible and to relax the heat resisting property required for the airbag, a gas-generator storage chamber of the airbag is provided at the lower surface thereof. The gas-generator storage chamber houses most of a gas generator. A gas guide member is disposed to surround gas jet ports at the end of the gas generator. Outlets of the gas guide member are arranged above a seaming section in the airbag. In one form, an entry of the gas guide member and an opening of the airbag are firmly bound to the gas generator with a band.

2 Claims, 6 Drawing Sheets

PROTECTIVE BAG DEVICE FOR PEDESTRIAN AND THE LIKE

FIELD OF THE INVENTION

The present invention relates to a protective bag device for a pedestrian and the like, which is inflated along the outer surface of a vehicle.

BACKGROUND OF THE INVENTION

A protective bag device for a pedestrian and the like is known which is inflated along the outer surface of a vehicle, in order to protect a person, such as a pedestrian and a rider of a bicycle (hereinafter, referred to as a pedestrian and the like) whose body may be hit against the outer surface of the vehicle in a collision.

Japanese Unexamined Patent Application Publication No. 2000-118337 discloses that a rectifier fabric is provided in a flat airbag and a gas flow from the inflator is directed to four corners of the airbag, in order to make the airbag completely filled with a gas generated by an inflator.

In Japanese Unexamined Patent Application Publication No. 2000-118337, since the rectifier fabric is combined by seaming or welding (see paragraph 0015), it is time-consuming to manufacture the airbag.

SUMMARY OF THE INVENTION

Accordingly, it is an object of the present invention to facilitate the manufacture of an airbag in a protective bag device for a pedestrian and the like in which a gas from a gas generator is substantially uniformly supplied to a wide range in the airbag to inflate the entire airbag as uniformly as possible.

In a protective bag device for a pedestrian and the like according to the invention having an airbag inflatable along the outer surface of a vehicle and a gas generator for supplying a gas into the airbag, the gas generator is cylindrical, at least the end of which is inserted into the airbag through an opening provided in the airbag; the airbag has therein a gas guide member including an entry of the gas generator, a part surrounding the gas generator, and an outlet for discharging a gas from the opening into the airbag; and the opening of the airbag and the entry of the gas generator are fitted on the gas generator with them overlapping one another and are firmly bound to the gas generator with a binding member.

In such a protective bag device for a pedestrian and the like, since a gas from a gas generator is substantially uniformly supplied to a wide range in the airbag through a gas guide member, the entire airbag can be inflated as uniformly as possible.

The gas guide member also produces an advantage of preventing the jet gas from the gas generator from directly striking against the inner surface of the airbag.

In the invention, the entry of the gas guide member is fitted on the gas generator together with the opening of the airbag and is firmly bound with a binding member; accordingly, the three components, the gas guide member, the airbag, and the gas generator, are connected together. This eliminates the need for seaming or welding for connecting the gas generator to the airbag, thus facilitating the manufacture of the airbag.

Preferably, the gas guide member is made of cloth. The gas guide member made of cloth can be folded together with the airbag.

In order to further uniformly inflate the airbag, the gas outlet may be provided with a cylindrical section, and the gas outlet may be disposed in at least the circumferential surface of the cylindrical section.

DETAILED DESCRIPTION OF THE PREFERRED EMBODIMENTS

Figure 1:
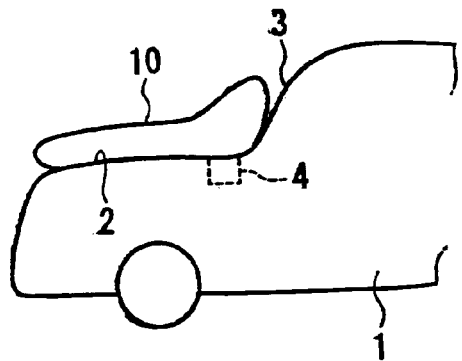
FIG. 1 is a side view of the hood of a vehicle having a protective bag device for a pedestrian and the like according to an embodiment.
Figure 2:
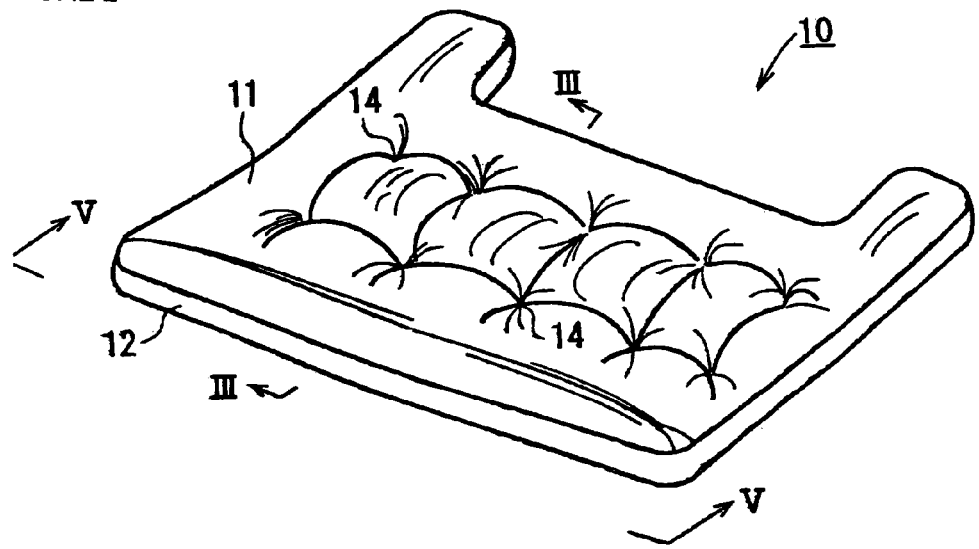
FIG. 2 is a perspective view of the protective bag device for a pedestrian and the like of FIG. 1.
Figure 3:
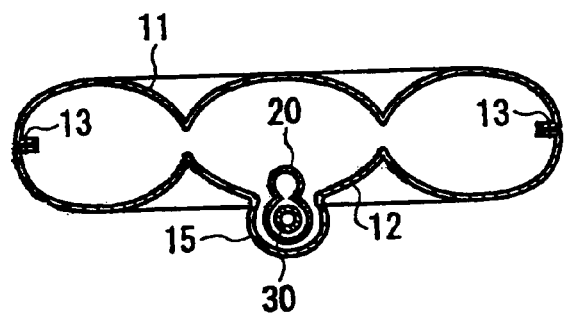
FIG. 3 is a sectional view taken along line III—III of FIG. 2.
Figure 4:
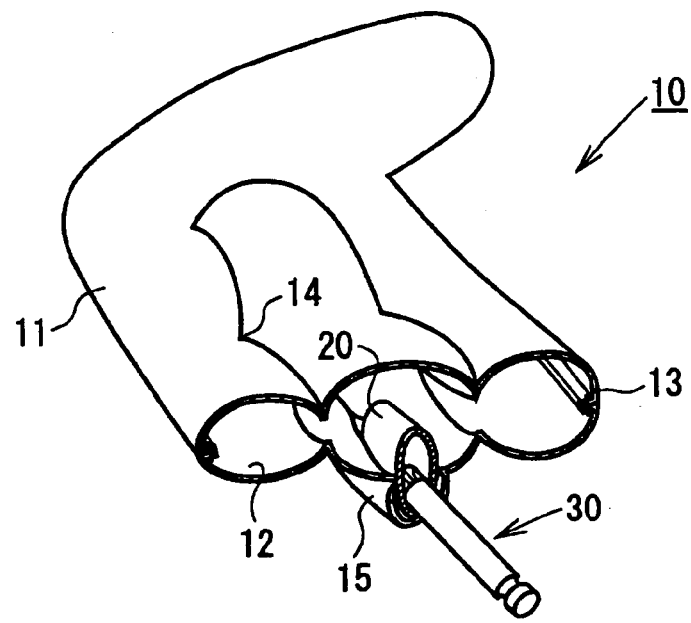
FIG. 4 is a perspective view of the same cross section as FIG. 3.
Figure 5:
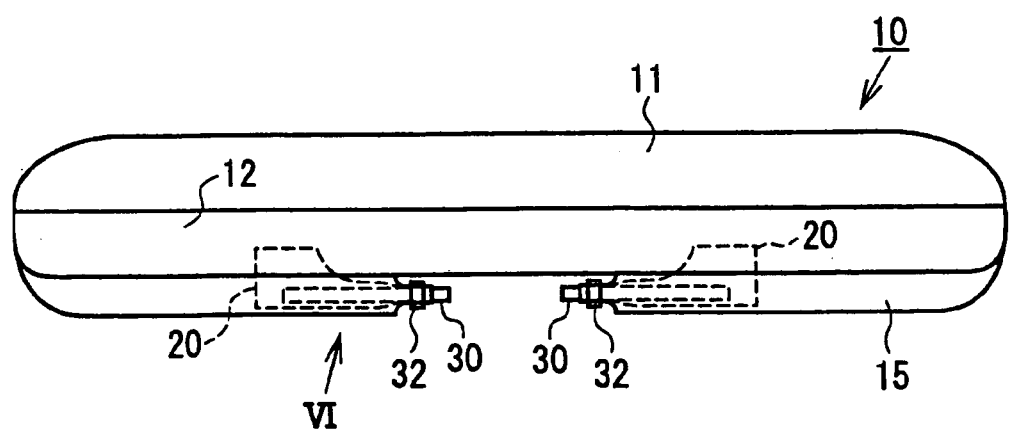
FIG. 5 is a view on arrow, taken along line V—V of FIG. 2.
Figure 6:
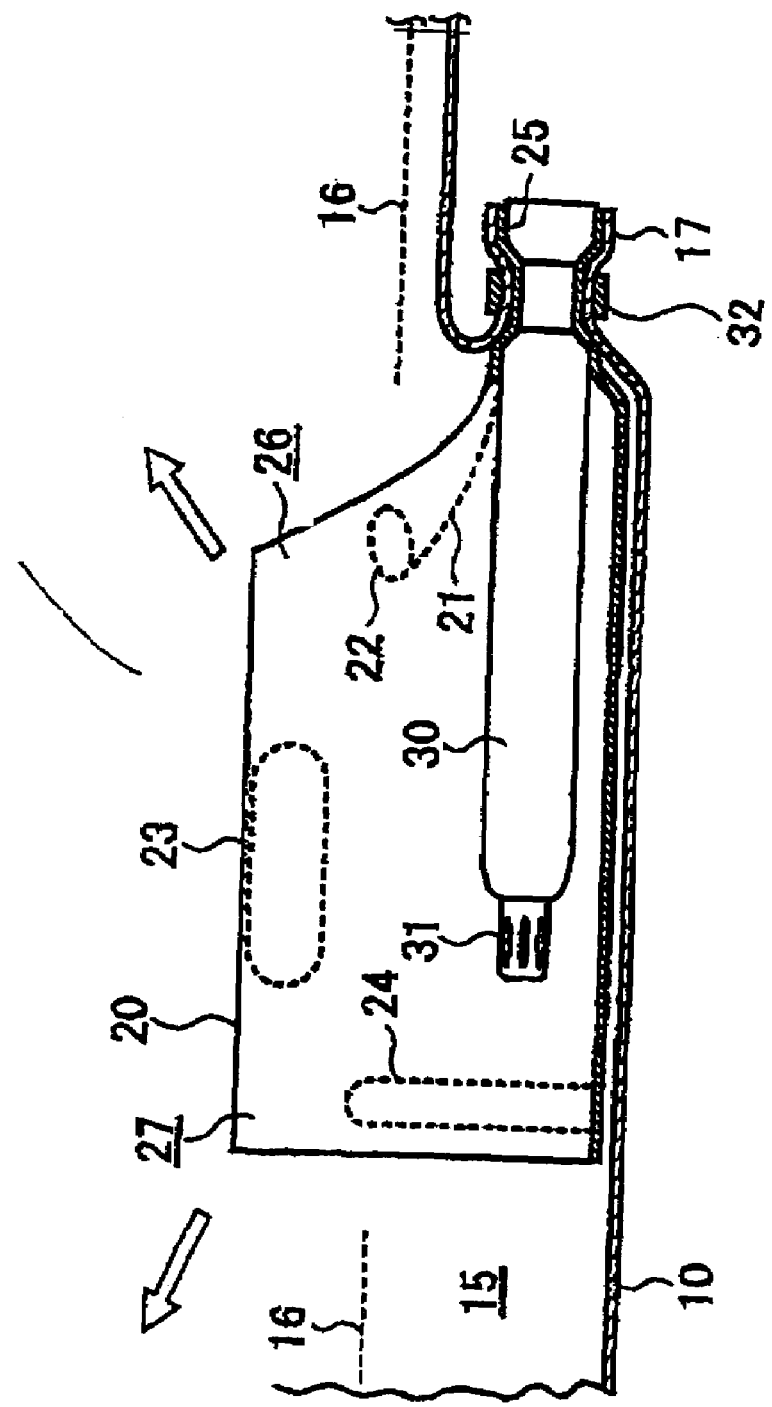
FIG. 6 is a longitudinal sectional view of part VI of FIG. 5.
Figure 7:
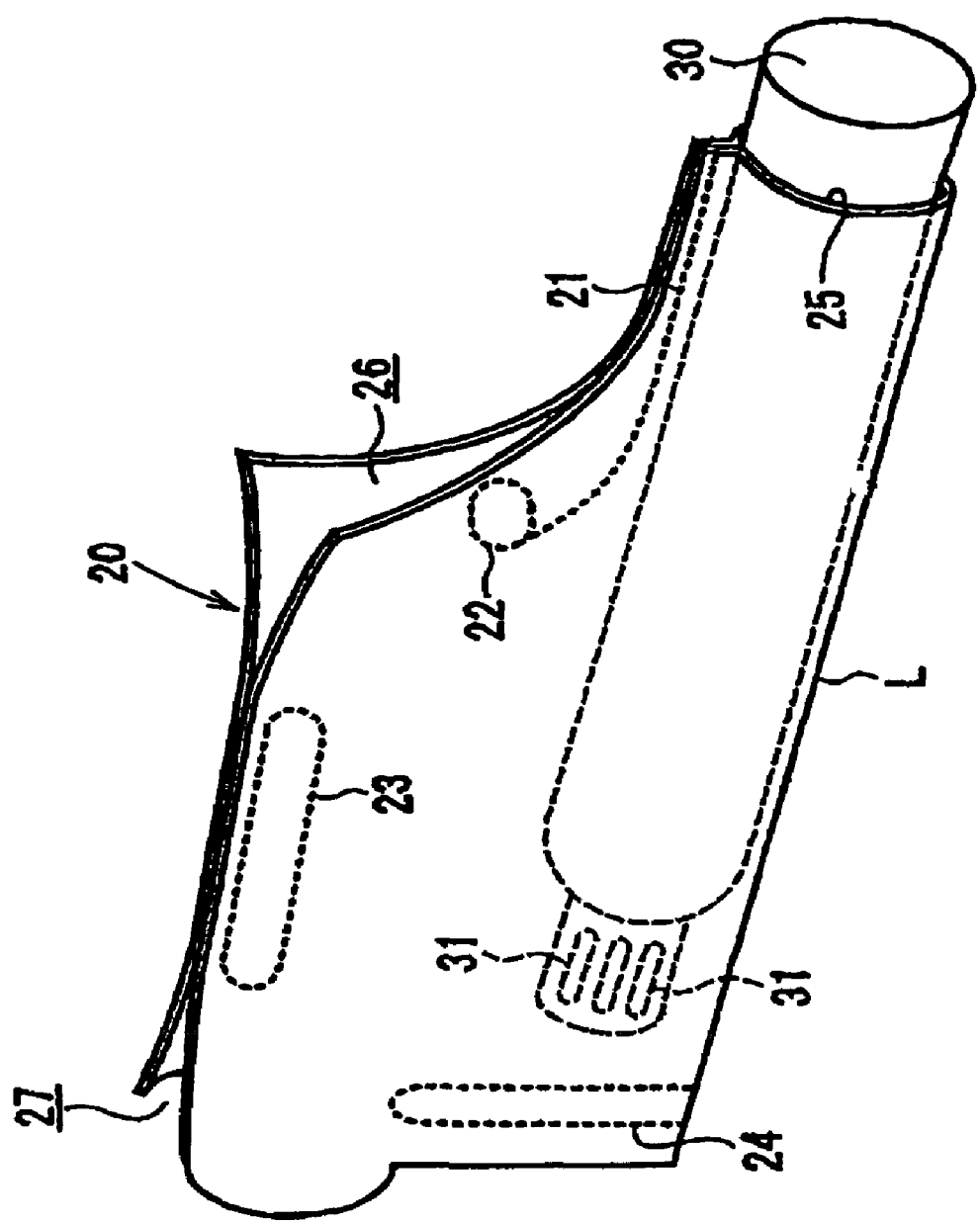
FIG. 7 is a perspective view of a gas guide member and a gas generator.

An embodiment will be further described with reference to the drawings. FIG. 1 is a side view of the hood of a vehicle having a protective bag device for a pedestrian and the like according to an embodiment; FIG. 2 is a perspective view of the protective bag device for a pedestrian and the like of FIG. 1; FIG. 3 is a sectional view taken along line III—III of FIG. 2; FIG. 4 is a perspective view of the same cross section as FIG. 3; FIG. 5 is a view on arrow, taken along line V—V of FIG. 2; FIG. 6 is a longitudinal sectional view of part VI of FIG. 5; and FIG. 7 is a perspective view of a gas guide member and a gas generator.

In this embodiment, an airbag 10 is inflated from a hood 2 of a vehicle 1 to a windshield 3, as shown in FIG. 1. In FIG. 1, the airbag 10 is in an inflated (expanded) state. The airbag 10 before expansion is stored in a casing 4 after being folded. The casing 4 is water-tightly closed by an openable and closable lid (not shown). Upon sensing or predicting a collision of a pedestrian, an inflator (gas generator) operates to start the expansion of the airbag 10. The lid is pushed to be opened by the airbag 10, and the airbag 10 is inflated along the hood 2 and the windshield 3.

The airbag 10 is formed into a bag by seaming an upper foundation fabric 11 and a lower foundation fabric 12 together along the periphery thereof Reference numeral 13 denotes a seaming section of the periphery of the airbag. In order to make the airbag 10 flat, the upper foundation fabric 11 and the lower foundation fabric 12 are seamed together also in a predetermined section 14 other than the periphery.

The airbag 10 has a gas-generator storage chamber 15 at the lower surface thereof. The gas-generator storage chamber 15 is formed such that the lower foundation fabric 12 is grasped out toward the exterior (downward) and the base of the grasped portion is seamed together (the seaming section is denoted by reference numeral 16 of FIG. 6). In this embodiment, two gas-generator storage chambers 15 are disposed to extend linearly. The two gas-generator storage chambers 15 are arranged in a straight line and separately from each other by a predetermined distance. An opening 17 is provided at each of facing ends of the two gas-generator storage chambers 15.

The gas-generator storage chamber 15 includes the lower half of a gas guide member 20 therein. The structure of the gas guide member 20 will be described hereinafter.

The gas guide member 20 is formed such that a piece of fabric is folded into two and the overlapped fabrics are partly seamed together at seaming sections 21, 22, 23, and 24; thus an entry 25 of a gas generator 30 and gas outlets 26 and 27 are formed. The entry 25 is located at one end of a folding line L of the fabric. The seaming section 21 extends diagonally from the edge of the entry 25 toward the upper left (in the direction to be separated from the entry 25 and the folding line L) of FIG. 7. The seaming section 21 is connected to the ring-shaped seaming section 22. The seaming section 22 is located at the lower edge of the gas outlet 26.

The seaming section 23 extends along the side substantially parallel to the folding line L. The right end (near the entry 25) of the seaming section 23 is located at the upper edge of the gas outlet 26. The left end of the seaming section 23 is located at the upper edge of the gas outlet 27.

The seaming section 24 extends along the side opposite to the entry 25 of the gas guide member 20 and in the direction substantially perpendicularly crossing to the folding line L. The lower end of the seaming section 24 reaches the folding line L and the upper end of the seaming section 24 is positioned at the lower edge of the gas outlet 27.

The gas generator 30 is cylindrical, having a plurality of gas jet ports 31 in the circumferential surface at the end thereof. The gas jet ports 31 are arranged at intervals along the circumference of the gas generator 30. The gas generator 30 houses gas generator agents in a pressure-resistant casing, having an ignition squib (not shown) at the rear end.

Most of the gas generator 30 in inserted into the gas guide member 20 from the end through the entry 25, as shown in FIG. 7. The whole body of the gas guide member 20 is placed in the airbag 10 and the entry 25 thereof is fitted in the opening 17 of the airbag 10, as shown in FIGS. 5 and 6.

The rear end of the gas generator 30 projects to the exterior from both the entry 25 and the opening 17. A band 32 is tightened from the outer periphery of the opening 17, so that the airbag 10, the gas guide member 20, and the gas generator 30 are connected together. The gas generator 30 has a recessed groove around the vicinity of the rear end thereof. The band 32 is fitted in the recessed groove, and so the gas guide member 20 and the airbag 10 are firmly bound. Since the gas guide member 20 can be integrated with the airbag 10 without by seaming or welding, the airbag 10 can be easily manufactured.

The upper half of the gas guide member 20 enters above the seaming section 16 in the airbag 10 from the gas-generator storage chamber 15. The gas outlets 26 and 27 are arranged above the seaming section 16 in the airbag 10.

In the protective bag device for a pedestrian and the like with such a structure, when the inflator 30 operates, a gas flows into the gas guide member 20 and spouts out from the gas outlets 26 and 27 of the gas guide member 20 to inflate the airbag 10.

In this embodiment, since a gas is blown into the airbag 10 dispersively through the gas guide member 20, the airbag 10 is inflated substantially uniformly as a whole. The gas guide member 20 prevents the gas from the gas generator 30 from hitting against the closest vicinity of the gas jet ports 31 of the inner surface of the airbag 10. Accordingly, a desired value of the heat resisting property required for the airbag 10 can be moderated.

Figure 8:
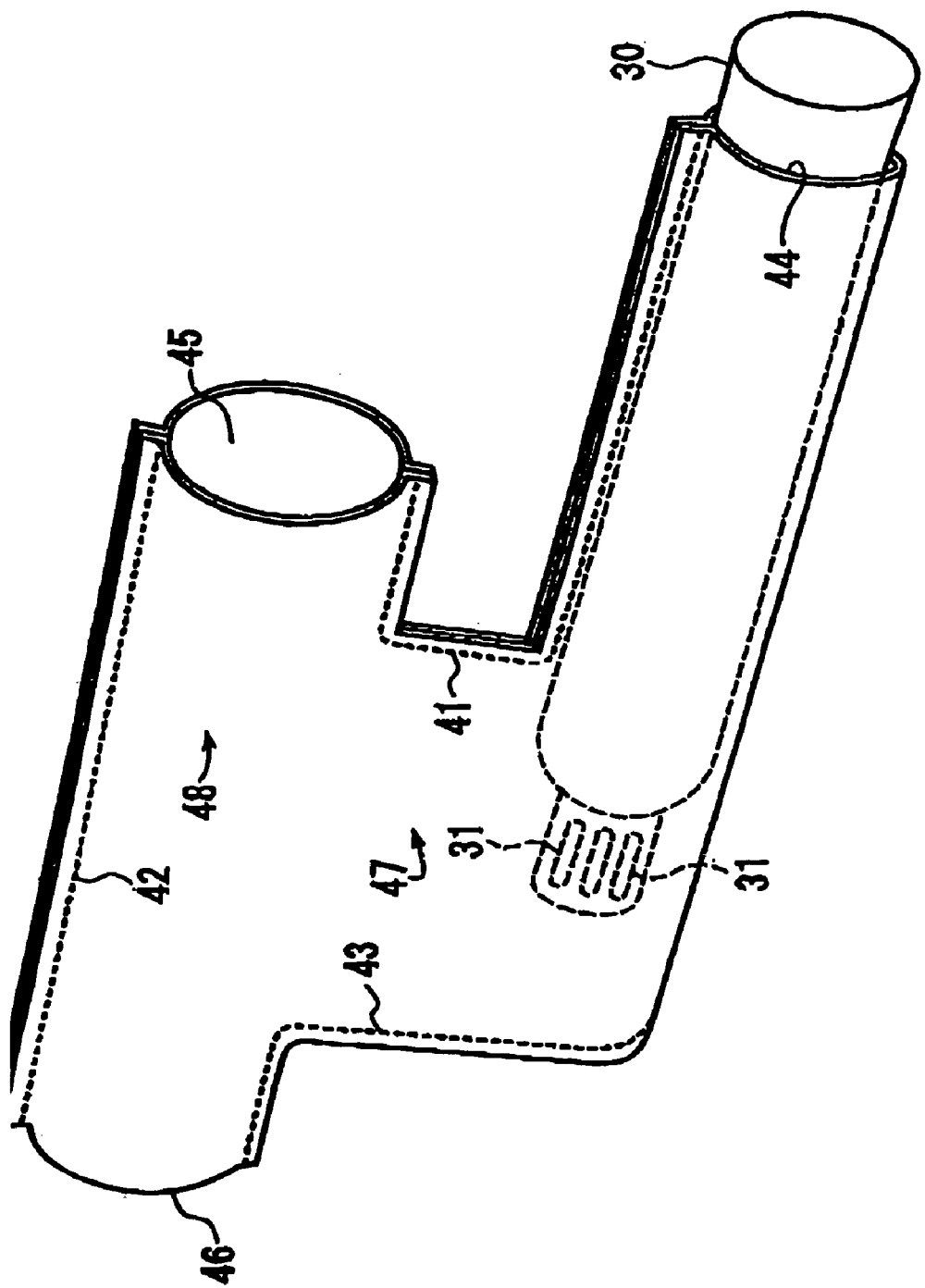
FIG. 8 is a perspective view of a gas guide member used in another embodiment.
Figure 9:
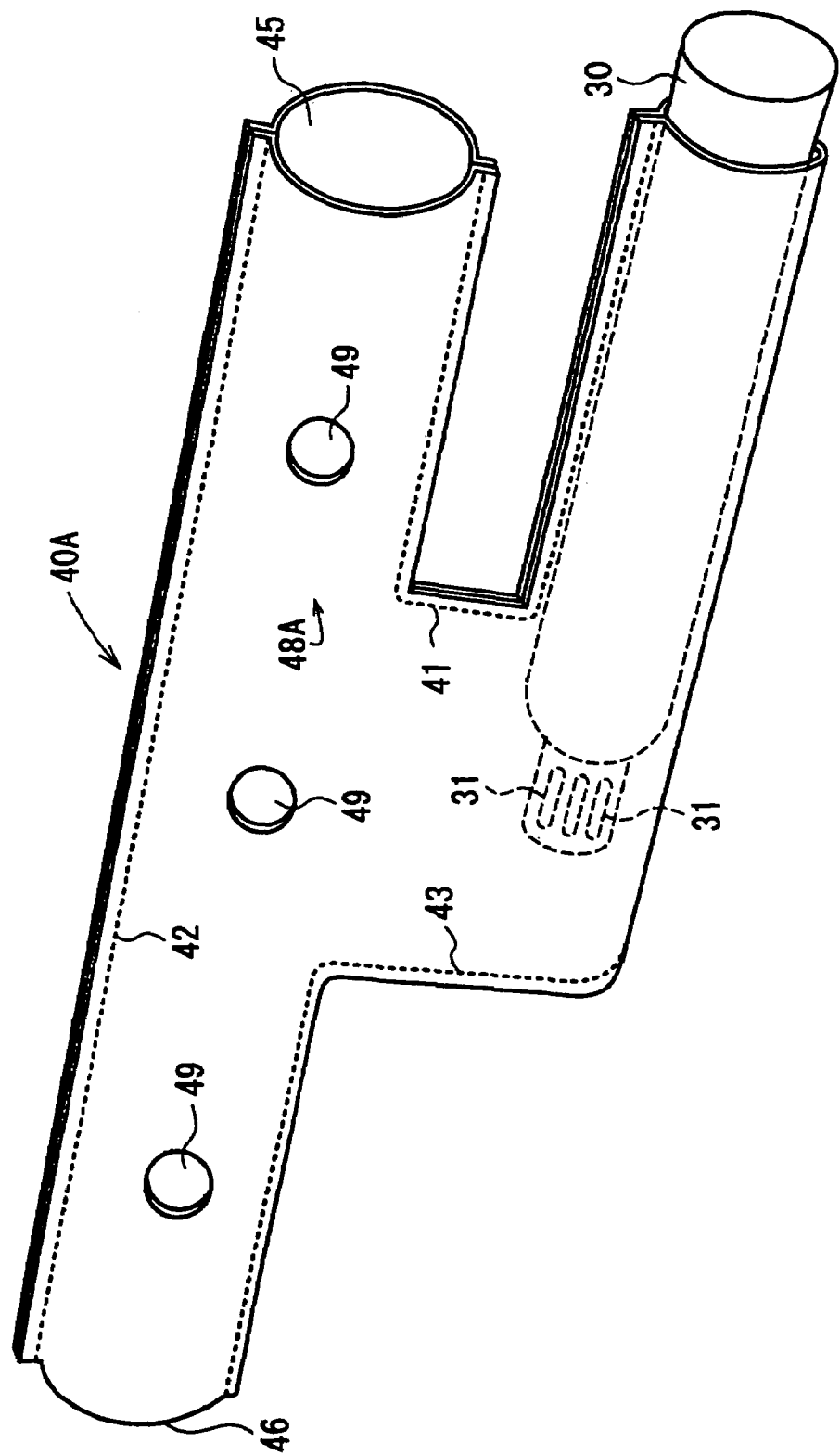
FIG. 9 is a perspective view of a gas guide member used in still another embodiment.

FIGS. 8 and 9 are perspective views of gas guide members 40 and 40A, respectively, which are used in other embodiments of the present invention.

The gas guide member 40 of FIG. 8 is formed such that a fabric is folded into two and required portions at the edge are seamed together at seaming sections 41, 42, and 43, and thus an entry 44 of the gas generator 30 and gas outlets 45 and 46 are formed.

In this embodiment, the gas guide member 40 has a cylindrical section 48 extending substantially parallel with the gas generator 30 and a throat 47 which guides the gas from the gas jet ports 31 into the cylindrical section 48. Both ends of the cylindrical section 48 serve as gas outlets 45 and 46.

The cylindrical section 48 is disposed above the seaming section 16 in the airbag 10.

The gas guide member 40A of FIG. 9 has the cylindrical section 48A shaped like a long cylinder in which both ends of the cylindrical section 48 are further extended. The cylindrical section 48A has a plurality of gas outlets 49 also in the circumference. Other structures are the same as those of the gas guide member 40.

Also a protective bag device for a pedestrian and the like, which has such gas guide members 40 and 40A, produces the advantages similar to the protective bag devices for a pedestrian and the like in FIGS. 1 to 7. Particularly, using the gas guide member 40A of FIG. 9 allows the airbag 10 to be quickly inflated in two cross directions because the cylindrical section 48A has the gas outlets 49 also in the circumference thereof.

Since the above-described embodiments are only examples of the present invention, it is to be understood that the invention can employ other structures other than those described above.

According to the invention, an airbag of a protective bag device for a pedestrian and the like can be inflated as uniformly as possible, as described above. Also, the airbag can easily be manufactured, thus allowing cost reduction. Furthermore, the heat resisting property required for the airbag can be eased.

What is claimed is:

1. An external air bag device comprising:
   an inflatable airbag of a predetermined material;
   a gas generator operable to inflate the airbag;
   a gas guide member of a predetermined material extending into the airbag for receiving gas from the gas generator and directing it into the airbag; and
   a connector member that attaches the guide member and the air bag to the gas generator in a single, securing operation and without breaching the material of either the guide member or airbag, wherein the airbag includes a lower surface, and a chamber projecting down below the lower surface and having an opening for receiving the gas guide member and generator therein.

2. The external airbag device of claim 1 wherein the chamber includes a pair of opposite chambers that project down below the airbag lower surface and include respective openings that are spaced and in facing relation with the chambers aligned with each other for receiving a pair of gas guide members and generators therein.

* * * * *